United States Patent
Milliorn et al.

(10) Patent No.: US 10,713,872 B1
(45) Date of Patent: Jul. 14, 2020

(54) ACCESS TO CONTROLLED-ENVIRONMENT FACILITY VISITATION CENTERS AND CONTROLLED-ENVIRONMENT FACILITY RESIDENT VISITS

(71) Applicant: Securus Technologies, Inc., Carrollton, TX (US)

(72) Inventors: Danny C. Milliorn, Waxahachie, TX (US); Adam Christopher Edwards, Fort Worth, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 16/261,542

(22) Filed: Jan. 29, 2019

(51) Int. Cl.
 *G07C 9/20* (2020.01)
 *G06K 7/14* (2006.01)

(52) U.S. Cl.
 CPC ............. *G07C 9/20* (2020.01); *G06K 7/1417* (2013.01)

(58) Field of Classification Search
 CPC .............. G06K 7/1417; G07C 9/00007; G07C 9/00031; G07C 9/0087; G07C 9/00103
 See application file for complete search history.

(56) References Cited

U.S. PATENT DOCUMENTS

| | | | |
|---|---|---|---|
| 9,106,789 B1* | 8/2015 | Shipman, Jr. | H04N 7/147 |
| 2008/0000966 A1* | 1/2008 | Keiser | G06O 10/10 |
| | | | 235/382 |
| 2014/0045472 A1* | 2/2014 | Sharma | H04W 4/08 |
| | | | 455/416 |
| 2018/0232973 A1* | 8/2018 | Teh | G07C 9/00015 |

* cited by examiner

*Primary Examiner* — Laura A Gudorf
(74) *Attorney, Agent, or Firm* — Fogarty LLP

(57) ABSTRACT

Systems and methods for controlling access to controlled-environment facility visitations enable and accept requests for visitations with residents of the controlled-environment facility and enable and accept scheduling of visitations with residents of the controlled-environment facility. A matrix barcode is assigned to each scheduled visitation in accordance with such systems and methods, and the resultingly assigned matrix barcode is provided to at least a non-resident taking part in a respective scheduled visitation, and in some implementations, to the resident. The visitation proceeds between the resident scheduled to take part in the scheduled visitation and the non-resident in response to confirmation that the non-resident, and in applicable implementations, the resident, is in possession of the assigned matrix barcode.

18 Claims, 3 Drawing Sheets

ACCESS TO CONTROLLED-ENVIRONMENT FACILITY VISITATION CENTERS AND CONTROLLED-ENVIRONMENT FACILITY RESIDENT VISITS

TECHNICAL FIELD

This specification is related to controlled-environment facilities, specifically to visitation with controlled-environment facility residents, and particularly to processes and systems for accessing controlled-environment facility visitation centers and controlled-environment facility resident visits, via matrix barcoded tickets.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. At visitation centers in correctional facilities, the current methodology for visitors to pass security checks involved a visual check and collection of government issued identification, such as a driver's license or the like. More recently, technological advances have allowed jails and prisons to provide other types of visitation, including individual-to-individual videoconferences, which may be typically referred to as video visitation, online chat sessions, and the like.

Providing in-person visits requires the controlled-environment facility to implement procedures by which both the visitor and the inmate are closely screened and monitored in order to prevent the transfer of contraband during the in-person visit. Another type of offered visitation session involves an inmate and a visitor communicating audio via visitation terminals while physically separated by a glass or otherwise transparent barrier that allows the parties to see each other during the visitation. Another type of visitation session that may be offered involves an inmate and a visitor participating in a video visitation session, each using visitation terminals that include audio and video capabilities. Although such video visitations do not technically require the visitor to be present at the controlled-environment facility, various rules and restrictions may require that a visitation session be conducted in a monitored visitation area or center.

Additionally, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel, thereby making visitation administration problematic.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide scheduling for, and access to, controlled-environment facility visitation centers and/or areas and/or access to the controlled-environment facility resident visits themselves. Therein, a controlled-environment facility visitation system, or the like, receives a request for a visitation, video or in-person, with a respective resident of the controlled-environment facility. This request may be initiated by a non-resident, or in some implementations by the controlled-environment facility resident. The controlled-environment facility visitation system, or the like, may then facilitate scheduling of the visitation. In accordance with the present systems and methods, the controlled-environment facility visitation system, or the like, assigns a matrix barcode, or the like, to the visitation and provides the resultingly assigned matrix barcode to at least one non-resident taking part in the visitation. This matrix barcode may be provided to the non-resident and/or resident on a personal communications and/or media device associated therewith.

At a controlled-environment facility, or associated visitation center, possession of the assigned matrix barcode, by the visiting non-resident (and the resident) is confirmed and/or verified, such as by barcode reading equipment or software, which may then communicate this confirmation to the controlled-environment facility visitation system, or the like. The controlled-environment facility visitation system, or the like, may then enable the visitation to proceed between the resident and non-resident in response to this confirmation.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
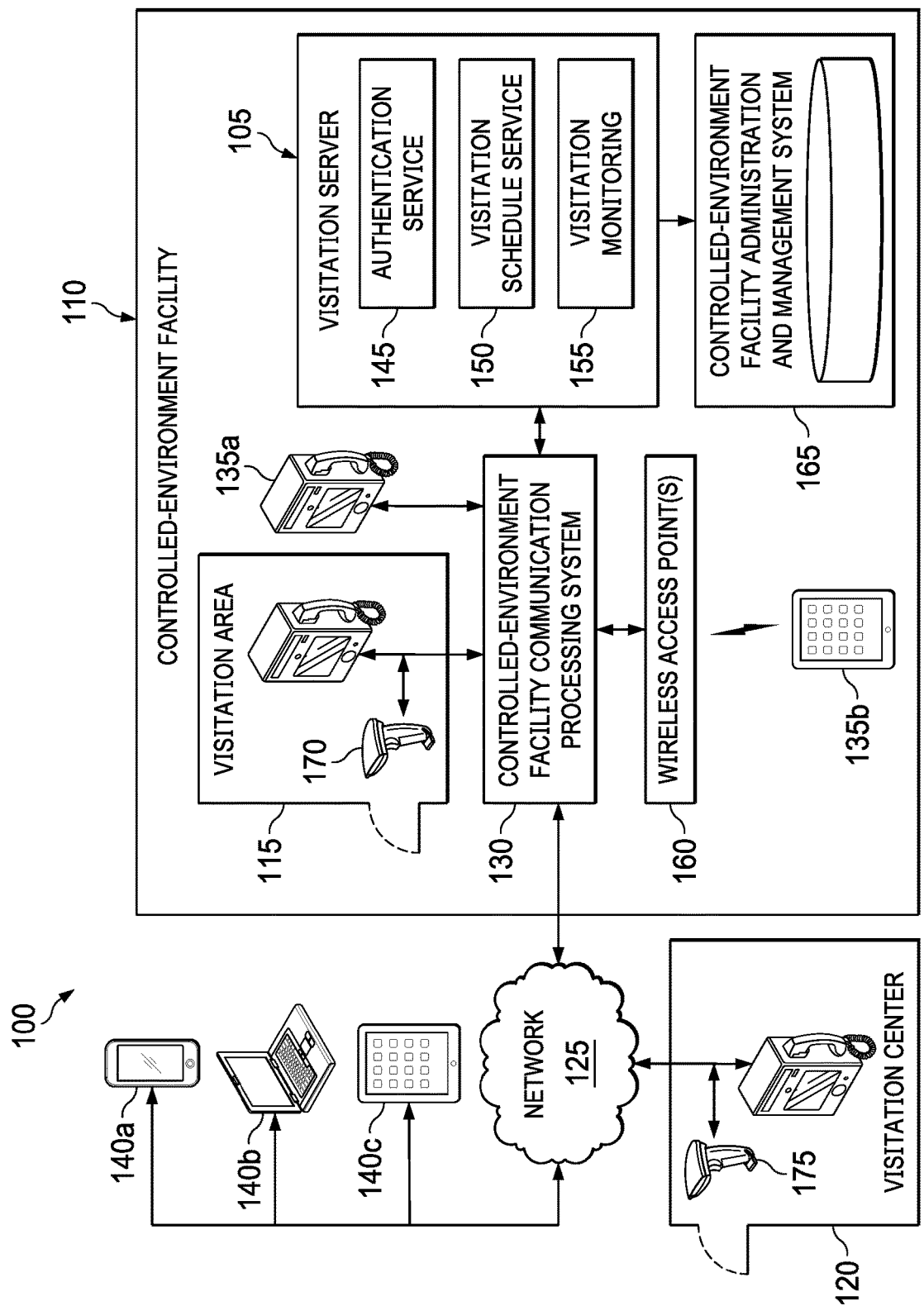
Figure 2:
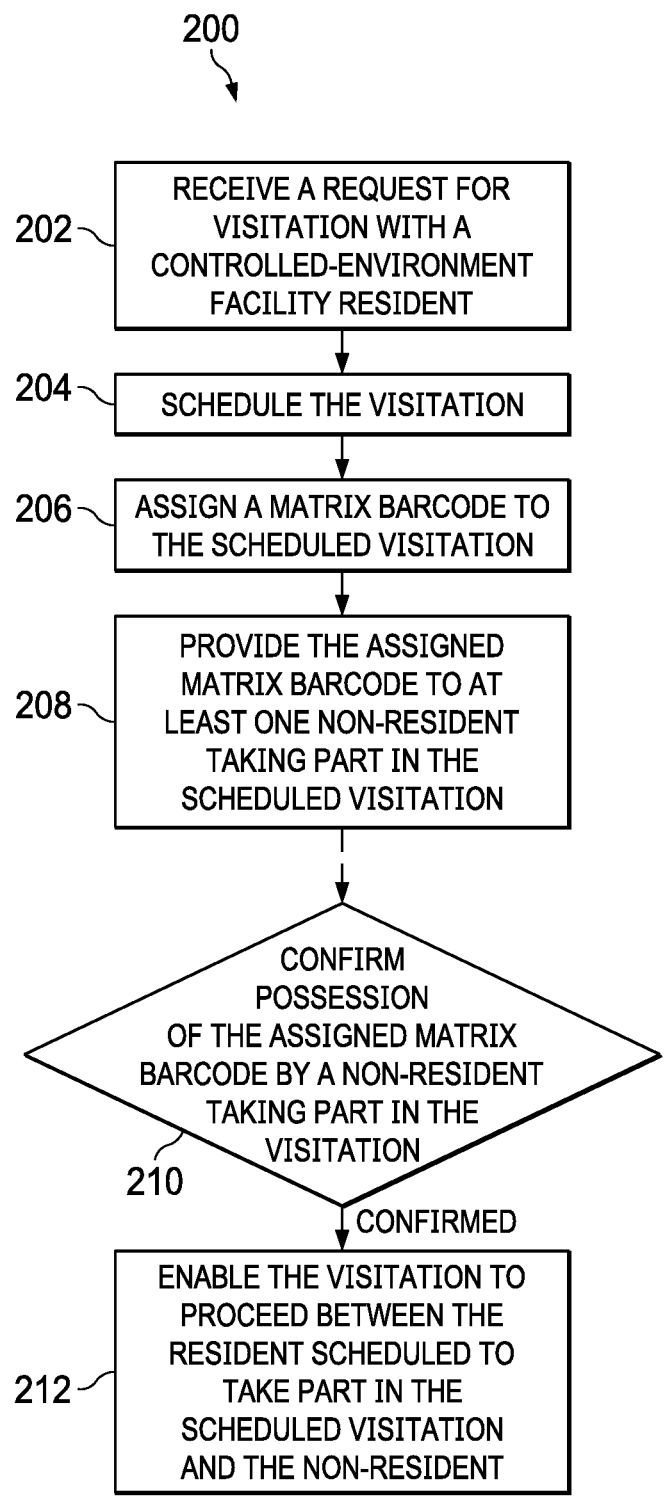
Figure 3:
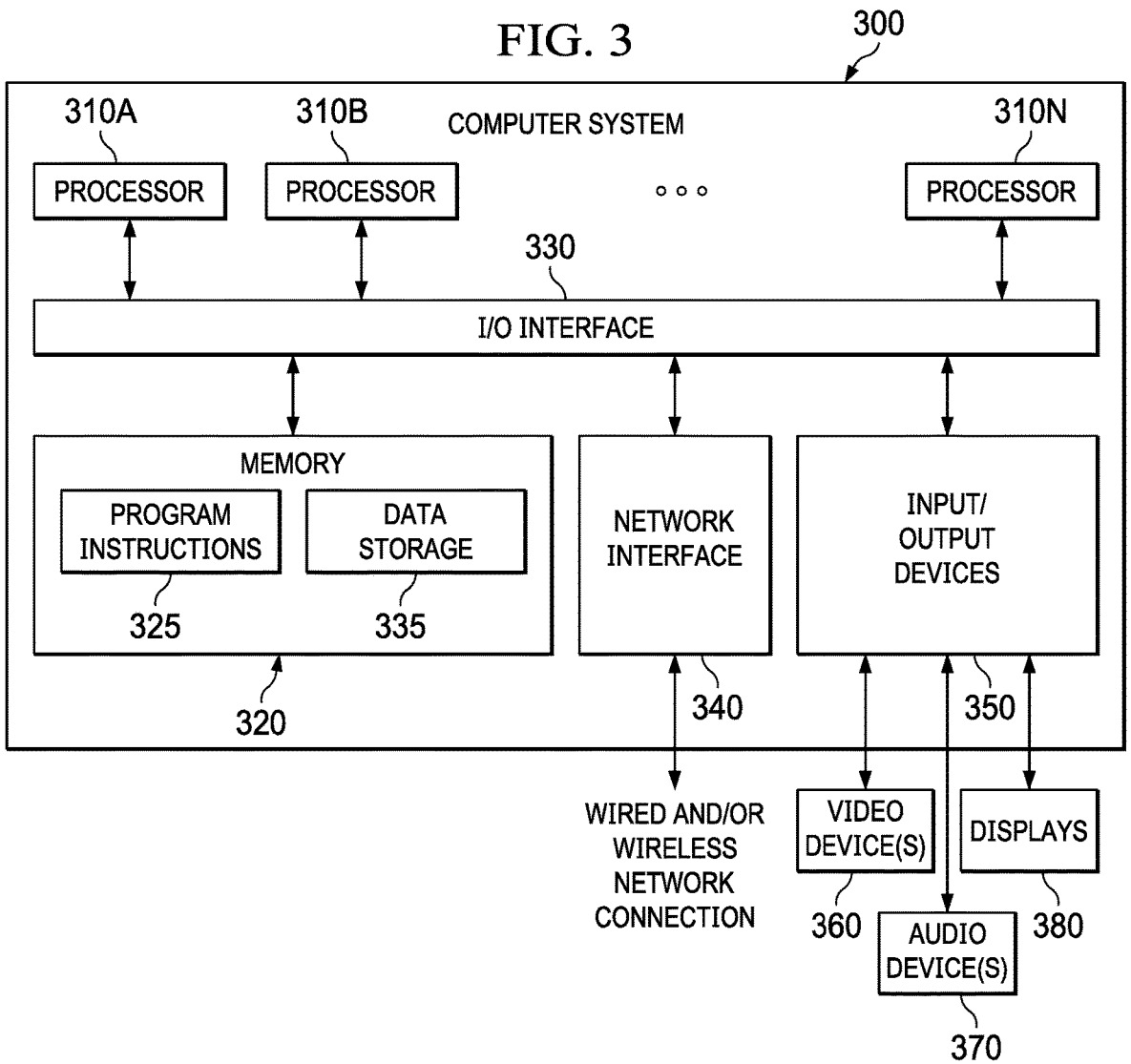

Having thus described the invention in general terms, reference will now be made to the accompanying drawings, which are not necessarily drawn to scale, and wherein:

FIG. 1 is a diagram illustrating certain example components of an example visitation system according to various embodiments for providing residents of a controlled environment facility with visitation services, in accordance with various embodiments of the present systems and methods;

FIG. 2 is a flowchart of an example process for scheduling and accessing controlled-environment facility visitation centers and/or controlled-environment facility resident visits, according to some embodiments; and FIG. 3 is a block diagram of a computer system, server, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Embodiments of the present systems and methods are related to controlled-environment facilities, specifically to visitation with controlled-environment facility residents, and particularly to access to controlled-environment facility visitation centers and controlled-environment facility resident visits via ticket processes and systems. In accordance with embodiments of the present systems and methods, access to controlled-environment facility visitations may be initiated by enabling and accepting requests for visitations with residents of the controlled-environment facility and enabling and accepting scheduling of visitations with residents of the controlled-environment facility. A matrix barcode, or the like, is assigned to each such scheduled visitation, and the resultingly assigned matrix barcode is provided to at least a non-resident taking part in a respective scheduled visitation, and in some implementations, to the resident. The visitation proceeds between the resident and the non-resident in response to confirmation that the non-resident, and in applicable implementations, the resident, is in possession of the assigned matrix barcode.

Embodiments of the present systems and methods call for "embedding" a matrix barcode, such as a QR™ (Quick Response) code, "two-dimensional" (2D) barcode, three-dimensional (3D) barcode, or the like within a scheduled video, or in-person, controlled-environment facility visitation to act as a "ticket" for identification to gain entry into a controlled-environment facility visitation center and/or to initiate the visitation session, at least from the perspective of the visitor.

A matrix barcode, also referred to as a "data matrix" or a "two-dimensional" barcode is a machine-readable optical label that contains information. Matrix barcodes generally use standardized encoding modes to store data efficiently. Matrix barcodes are popular due to their fast readability and greater storage capacity, compared to standard Universal Product Code (UPC) barcodes. Matrix barcode consists of black squares, or "cells," arranged in a square, circular or rectangular grid on a white background, or a white barcode with a black background or any color combination. These cells generally represent bits, which can be read by an imaging device such as a camera, and processed using Reed-Solomon error correction, or the like, until the image can be appropriately interpreted. The required data is then extracted from patterns that are present in both horizontal and vertical components of the image. The information to be encoded can be text or numeric data. The length of the encoded data depends on the number of cells in the matrix. Error correction codes are often used to increase reliability, such that even if one or more cells are damaged so it is unreadable, the message can still be read. A typical data matrix barcode can store up to 2,335 alphanumeric characters. A matrix barcode incorporating color, may typically be referred to as a "three-dimensional" (3D) barcode, wherein the "third dimension" is provided by various colors, providing even greater capacity. Whereas a "two dimensional" matrix barcode can encode information such as a file location or URL of a digital image, such a 3D matrix barcode can encode the digital image itself. A 3D matrix barcode can encode up to 1.8 Mb. As referred to herein, a "matrix barcode" may be a QR™ code, other "two-dimensional" (2D) barcode, a three-dimensional (3D) barcode, or the like.

The matrix barcode may be "embedded" within a scheduled visitation by associating it with the scheduled visitation, such that a visitor may print-out a ticket that includes the matrix barcode for presentation to gain entry to a controlled-environment facility visitation center and/or to initiate the visitation. Alternatively, or additionally, parties to the visitation may be provided the matrix barcode on an electronic device such as a wireless telephone, tablet computing device, media player, or the like, for presentation at the visitation center, and/or for presentation to initiate the visitation. In any case, the matrix barcode may be read (imaged) by facility equipment, such as a digital camera, linked to a controlled-environment facility visitation system/server, by the possessor holding the printed or displayed matrix barcode up to a terminal, such as a video visitation terminal, or the like.

Advantageously, the present systems and methods alleviative visiting friends and family members from the need to remember a randomly generated PIN, or the like, tied to the visitation session. They would only need to bring the "ticket" (i.e. a print-out or device screen displaying the matrix barcode associated with the visitation session) to gain entry and conduct a visit. Also, in accordance with various embodiments of the present systems and methods advertising may be presented on the ticket, whether printed or displayed on a device. This advertising may offer communications discounts, incentives to fund (a) trust account(s) associated with the visitation resident, ability to use the data associated with the ticket for other purposes, etc.

As noted, the current methodology for passing security checks at visitation centers in, or associated with, correctional facilities, and the like, typically involves a visual check and collection of government issued ID. Embodiments of the present systems and methods may associate metadata, to be displayed via a scan check of the matrix barcode for verifications, such as information related to the visitation such as location of visit, date, time, a terminal to be used, additional visitors such as children, additional information about the visitor (e.g. relationship to the resident being visited, any criminal record, and the like) etc. as well as metadata related to the resident/inmate.

One issue with visitation is efficiency. Often, visitation lines are long due to safety concerns. This results in missed visitations and visitation schedules being backed up. Hence, visitations are typically limited to a half hour to one hour in length. To address contraband issues, some facilities do not allow visitors to bring anything into the facility, including wallets, purses, backpacks. Use of the present matrix barcodes advancement, over traditional ID based methods, help to address many concerns over contraband entering facilities, such as by facilitating use of remote visitation centers and the like. For example, the "ticket" (printout or displayed) may have the contact's picture, their license number, the relation to inmate and/or other pertinent identification. The ticket may be used to check in, and check out. So, the visitor would be scanned in and scanned out when they leave so there is an accurate count of the number of people in and out. Also, the ticket may include a Radio Frequency Identification (RFID) tag that shows exactly where the contact is at all times. consistent with the above, contraband concerns may be alleviated if the contact is not allowed to bring anything but the ticket. Also, there could be a watermark on the ticket, RFID, etc., which may be used to verify the validity of the ticket. Thus, the validity of ticket and the validity of the person may be ascertained in accordance with embodiments of the present systems and methods. Thereby, embodiments of the present systems and methods increase security by having controlled-environment facility personnel and controlled-environment facility visitation systems read barcodes to ensure visitation participants have a "ticket" (i.e. have registered and/or been vetted) to enter a secured visitation area and/or similarly access the controlled-environment facility and/or its visitation mechanisms or systems, enabling more efficient visits.

FIG. 1 is a diagram illustrating certain components of controlled environment facility visitation system 100 according to various embodiments. As illustrated, controlled environment facility visitation system 100 includes visitation server 105, which may be configured to facilitate visitation sessions between a resident of a controlled-environment facility and a non-resident. In various embodiments, visitation server 105 may assume a variety of forms. In certain embodiments visitation server 105 may be a component of a larger communications system that is utilized by the controlled environment facility. In certain scenarios, such a communications system may provide residents with access to various visitation services. For instance, a communications system may provide inmates with visitation services such as voice visitation services, video visitation services, email, online chats and/or messaging services.

In some embodiments, controlled environment facility visitation system 100 may be located within and serve a single controlled-environment facility 110. Alternatively, one or more components of controlled environment facility visitation system 100 may be centrally and/or remotely located with respect to one or more controlled-environment facilities. Whether serving a single controlled-environment facility or located remotely and serving multiple facilities, controlled environment facility visitation system 100 may be used to provide visitation sessions to residents of controlled-environment facilities, in which a non-resident may participate in the visitation sessions, such as from a monitored visitation area.

In certain embodiments, the non-resident's participation in the provided visitation services may be restricted to a specific visitation area provided by the controlled-environment facility such as visitation area 115 in controlled-environment facility 110 or visitation center 120, outside controlled-environment facility 110. For instance, a non-resident may be received at the visitation area or center by a staff member of the controlled environment facility that verifies the identity of the non-resident, such as by scanning a matrix barcode, or the like, assigned to the scheduled visitation, in accordance with embodiments of the present systems and methods. A printer or similar device may be provided in visitation area 115 in controlled-environment facility 110, and/or at visitation center 120, to print the matrix barcode ticket, such as in case the visitor forgets a matrix barcode ticket which they have printed. Upon being admitted to the controlled visitation area or center, the matrix barcode may again be scanned to initiate the scheduled visitation. By requiring the visitation session to be conducted with the non-resident at the visitation area or center, the controlled environment facility may provide visitation services while still monitoring all aspects of the resident's and the non-resident's participation in the visitation session. In addition, in the case of a video visitation, since the video visitation session is provided without the possibility of physical contact between the resident and the non-resident, less stringent security procedures may be utilized with regard to further physically screening the resident and the non-resident prior to visitation session to avoid the transfer of contraband.

As noted, visitation center 120 may be located outside controlled-environment facility 110. Such (video) visitation centers may be remote, with respect to the associated controlled-environment facility. For example, various visitation centers around the country may be associated with many controlled-environment facilities in other cities or states. Use of such remote visitation centers may be facilitated, or even enhanced, through use of embodiments of the present systems and methods. For example, such remote visitation centers may be automated, requiring the matrix barcode to enter the center and/or to initiate the visitation, once in the center. Also, in accordance with embodiments of the present systems and methods, a visitor may be more easily rerouted to another facility or center for the scheduled visitation, depending on overall scheduling of visitations, with the visitor only needing to present the matrix barcode to be allowed to conduct the (video) visitation at the reassigned center.

Visitation system 100 may be configured to provide, schedule, and manage visitation services to residents and non-residents of a controlled-environment facility, such as via visitation server 105. To that end, visitation server 105 may be coupled to external networks such as the PSTN, Internet, or the like, 125 such as through controlled-environment facility communication processing system 130. Visitation server 105 (and/or controlled-environment facility communication processing system 130) may include one or more gateways, switches and/or routers. Accordingly, visitation server 105 may be configured to communicate with one or more residents of the controlled-environment facility via devices 135*a*, 135*b*, etc. and with one or more non-residents via computing and/or communications devices 140*a*, 140*b*, 140*c*, etc. Thus, in accordance with embodiments of the present systems and methods, the matrix barcode assigned to the visitation may be provided to the non-resident on a personal communications and/or media device associated with the non-resident, such as non-resident wireless communications device 140*a*, tablet computing device 140*c*, media player, personal digital assistant, or the like. Although visitation server 105 is shown in FIG. 1 as being located within controlled-environment facility 110, in other cases visitation server 105 may be located remote with respect the facility and/or integrated within controlled-environment facility communication processing system 130.

In the illustrated embodiment, the visitation server 105 includes an authentication service 145 that processes identification authentication of non-residents and residents requesting and/or participating in visitation sessions. As illustrated in FIG. 1, the visitation server 105 may additionally include a visitation schedule service 150. In certain embodiments, the authentication service 145 may interface with the visitation schedule service 150 in order to determine if a requested visitation session has been properly scheduled and authorized. In certain embodiments, the visitation server 105 may additionally utilize the visitation schedule service 150 to enable non-residents and residents to access available capabilities for requesting and scheduling visitation sessions, subject to the restrictions and limitations that may be enforced on visitation sessions, such as limits on number and duration of visitation sessions allowed for a particular resident, specific dates and times during which visitation sessions allowed by the controlled environment facility, and the availability of visitation terminals that are required for residents to participate.

In certain embodiments, the controlled environment facility visitation system 100 may provide residents of the controlled-environment facility with communication services using controlled-environment facility communications terminals 135*a*. Similar communications terminals may be provided in visitation area 115 or visitation center 120 for use by non-residents. In accordance with embodiments of the present systems and methods, communications terminals 135*a* may provide residents and non-residents with the ability to participate in video visitation sessions. In certain scenarios, communications terminals 135*a* may be mounted on a wall, within a booth, or as part of a kiosk. In certain scenarios, controlled-environment facility communications terminal 135*a* may be a hardened terminal and may be installed in an area of the controlled-environment facility dedicated to providing residents with visitation sessions. Such a controlled-environment facility communications terminal 135*a* may be referred to as an Intelligent Facility Device (IFD), which may be a video phone particularly adapted for use in a controlled-environment facility. A controlled-environment facility communications terminal 135*a* may be adapted to provide residents with various additional services in addition to visitation sessions.

In various embodiments, controlled-environment facility communications terminals 135*a* may each include a video display, a camera, and a handset that includes a microphone and speakers. The display may be any suitable electronic display such as, for example, a Liquid Crystal Display (LCD) or a touchscreen display (e.g., resistive, capacitive, etc.). The camera included on controlled-environment facility communications terminal 135*a* may be any suitable imaging device such as, for instance, a video camera or webcam equipped with Charge-Coupled Devices (CCDs), Complementary Metal-Oxide-Semiconductor (CMOS) active pixel sensors, etc. The handset may be similar to a traditional telephone handset including an earpiece portion (with a speaker), a handle portion, and a mouthpiece portion (with a microphone), and/or a speakerphone arrangement may be provided. In certain embodiments, controlled-environment facility communications terminal 135*a* may allow a resident to utilize a headset with earphones and a microphone in place of a traditional handset. In accordance with embodiments of the present systems and methods, terminal 135*a*, including terminals (135*a*) located in secure visitation area 115 or in secure visitation center 120 for use by a visitor, may be enabled to read and verify the barcode, alone, or in conjunction with the controlled-environment facility visitation server 105, or the like.

In certain embodiments, controlled environment facility visitation system 100 may provide residents of the controlled-environment facility with visitation services using a portable communications device 135*b*. In certain embodiments, a controlled-environment facility resident personal portable communications device 135*b* may be a personal wireless devices, such as a tablet computing device or a smartphone device, that has been assigned to a resident. Similar to controlled-environment facility communications terminal 135*a*, portable communications device 135*b* may likewise include a camera, display, microphone and speakers and may be used both for voice visitation sessions and video visitation sessions. In certain scenarios, a portable communications device 135*b* may be referred to as an Intelligent Resident Device (IRD), or in a correctional institution environment, as an Intelligent Inmate Device (IID).

In many scenarios, controlled-environment facility resident personal portable communications device 135*b* may be especially adapted for use in a controlled-environment facility. For instance, in a correctional facility, the portability of portable communications device 135*b* may be limited by mounting or attaching the device on a wall, within a booth or as part of kiosk. In certain scenarios, portable communications device 135*b* may be protected within a hardened case that prevents any modifications to the hardware of the device. Various features of the hardware and/or software of the portable communications device 135*b* may be modified in order to prevent unauthorized use of the device. For instance, in a correctional institution, portable communications device 135b may operate using a specially adapted operating system or operating system kernel. Portable communications device 135b may also be restricted with respect to the allowed software applications that may be used by a resident. Portable communications device 135b may also be configured to prevent the resident from installing or modifying any applications on the device, thus limiting the resident to the use of software programs authorized for use by the controlled-environment facility. Portable communication device 135b may be assigned for use by a resident on a temporary or permanent basis.

In various scenarios, controlled-environment facility resident personal portable communications device 135b and/or controlled-environment facility communications terminal 135a may provide a resident of the controlled-environment facility with access to various software applications and services in addition to providing voice and video visitation sessions. For example, residents may be provided with legal research service, education services, employment search services, supervised email access, supervised online chat session, applications for playback of approved music and video files and/or supervised messaging. In certain scenarios, portable communications device 135b and/or controlled-environment facility communications terminal 135a may provide a resident with access to commissary services provided by the controlled-environment facility. In certain scenarios, portable communications device 135b and/or controlled-environment facility communications terminal 135a may include a web browser which may be limited to only accessing secure websites and/or third-party websites of approved vendors. Portable communications device 135b and/or a controlled-environment facility communications terminal 135a may also provide residents with access to various services specific to the controlled-environment facility, such as scheduling a visitation session and requesting medical appointments.

Controlled-environment facility resident personal portable communications device 135b may also be restricted with respect to the network connectivity that is afforded to a resident of the controlled-environment facility. In many scenarios, portable communications device 135b may be configured to connect only to a specific network hosted by one or more internal wireless access points 160. Portable communications device 135b may be further restricted to connect only to a specific wireless network available within certain areas of a controlled-environment facility, such as a dedicated visitation area or other supervised area. In certain scenarios, network connectivity for a portable communications device 135b may be limited by placing wireless access points 160 and positioning directional antenna within the physical structure of the controlled-environment facility such that the generated wireless signals are restricted to limited areas within the facility.

In many scenarios, use of controlled-environment facility communications terminal 135a and controlled-environment facility resident personal portable communications device 135b is limited based on security protocols implemented by the controlled environment facility visitation system 100. For instance, a resident may be required to enter a PIN (Personal Identification Number) before being allowed to use controlled-environment facility communications terminal 135a or portable communications device 135b. A resident may similarly be required to provide biometric verification, such as using a voice print, fingerprint, facial image or other biometric indicator in order to use controlled-environment facility communications terminal 135a or portable communications device 135b. Access to specific applications and services provided by controlled-environment facility communications terminal 135a and a portable communications device 135b may also be limited to residents based on additional security protocols, such as requiring a password, prior to allowing a resident to access specific services. Similarly, in accordance with some embodiments of the present systems and methods, the assigned matrix barcode may be provided to the resident's portable communications device 135b. Alternatively, facility officers might be enabled, in accordance with embodiments of the present systems and methods, to print the matrix barcode ticket for residents, or residents may be enabled to print the matrix barcode on a kiosks, or group printer, such as may be associated with terminal 135a. As a further alternative, or additionally, the visitation may be associated with an RFID device, such as an RFID bracelet, worn by the resident, which could be scanned to allow the resident to take part in a visitation in accordance with embodiments of the present systems and methods.

In the illustrated embodiment, the controlled environment facility visitation system 100 utilizes an administration and management system 165 in enforcing security protocols that are applicable to the use of communication services provided to residents of the controlled-environment facility. For instance, in providing the described visitation services, the visitation server 105 may limit a resident's visitation sessions to sessions with non-residents whose identities are listed in that resident's Pre-Approved Contact (PAC) and/or Personal-Allowed Number (PAN) list. In some scenarios, the information in the administration and management system 165 may be used by visitation server authentication service 145 to enforce restrictions prohibiting a resident from communicating with certain individuals identified in a "do not contact" list. In various scenarios, the identity of a non-inmate used by the visitation server 105 in enforcing such restrictions may be identified based on the phone number of the non-resident, the device presented for use by a non-resident and/or the email addresses or other accounts used by the non-resident. Each resident's PAC, PAN, and/or do not contact list(s) may be stored, for example, in database maintained by administration and management system 165. In certain scenarios, the administration and management system 165 may also be used to store biometric information used to authenticate individual users of the controlled environment facility visitation system 100. In addition to PAC, PAN, and/or do not contact list(s), administration and management system 165 may also store other security profiles and rules that are applicable to each resident.

The administration and management system 165 may also be used to manage information such as balances in a resident's trust, commissary and/or calling accounts. The administration and management system 165 may also provide access to other information pertaining to a resident, including for instance a resident's trial schedule, conviction data, criminal record, sentencing data (such as time served, time remaining to be served, and projected release date), cell and cellmate assignments, resident-specific restrictions and warnings, commissary order history, telephone call history, call recordings, known or suspected gang or criminal affiliations, known or suspected affiliates, accomplices, or gang members; and any other information that may be relevant or useful to correctional facility staff to house and maintain residents. In various embodiments, administration and management system 165 may be comprised of one or more separate systems.

As described, the controlled environment facility visitation system 100 may be configured to perform various monitoring operations related to visitation sessions. For instance, the controlled environment facility visitation system 100 may be configured to allow staff and/or third-party investigative services to monitor live visitation sessions and to interrupt or terminate an ongoing visitation session. In addition, the controlled environment facility visitation system 100 may record visitation sessions, such as by generating audio and/or video files of the visitation session. These recorded visitation sessions may be stored to a database maintained by the administration and management system 165. In certain embodiments, the controlled environment facility visitation system 100 may provide access to various tools that can be used to search the recorded visitation sessions in support of investigative activities.

In the embodiment of FIG. 1, the authentication service 145, visitation schedule service 150 and visitation monitoring 155 are components of the visitation server 105. In certain embodiments, one or more of these described functions of the visitation server 105 may instead be provided by systems external to the visitation server 105 or external to the controlled environment facility visitation system 100. In certain of such embodiments, one or more of the functions of the visitation server may be provided on behalf of multiple controlled-environment facilities by centralized systems.

Regardless, in accordance with embodiments of the present systems and methods visitation server 105 may be used, such as in conjunction with barcode reading equipment 170 or disposed in, or in association with, controlled-environment facility visitation areas 115 and/or centers 120, respectively, to implement processes for scheduling and accessing such visitation areas 115 and/or centers 120 and/or controlled-environment facility resident visits, such as described below.

FIG. 2 is a flowchart of example process 200 for scheduling and accessing controlled-environment facility visitation areas (115) or centers (120) and/or controlled-environment facility resident visits, according to some embodiments. At 202, a request for a visitation, video or in-person, with a respective resident of the controlled-environment facility (105) Is received in a controlled-environment facility visitation system (such as controlled-environment facility visitation system/server 105). The request at 202 may be initiated by a controlled-environment facility resident, or by a non-resident. The visitation with the respective resident of the controlled-environment facility may be scheduled at 204, such as via the controlled-environment facility visitation system/server.

At 206, a matrix barcode, or the like, may be assigned, such as by the controlled-environment facility visitation system/server (105) to the visitation, thereby embedding the matrix barcode within the visitation. The controlled-environment facility visitation system/server may, at 208, provide the matrix barcode resultingly assigned at 206 to at least one non-resident taking part in the visitation. The matrix barcode assigned at 206 may be provided to the non-resident at 208 on a personal communications and/or media device associated with the non-resident, such as the non-resident's wireless communications device (140*a*), tablet computing device (140*c*), media player, personal digital assistant, or the like. In accordance with various embodiments of the present systems and methods, the assigned matrix barcode may also be provided to the resident at 208. In such embodiments, the assigned matrix barcode is provided to the resident on a personal controlled-environment facility resident personal portable communications device (135*b*) associated with the resident.

Upon the non-resident scheduled to take part in the visitation arriving at the controlled-environment facility visitation area (115) in the controlled-environment facility (for an in-person visitation) or a visitation center (120) remote from the controlled-environment facility (for a video visitation), possession of the assigned matrix barcode, such as on a print-out of a ticket for the visitation or displayed on a personal digital device of the non-resident, is confirmed and/or verified, at 210. A printer or similar device may be provided in the visitation area (115) in the controlled-environment facility, or in the visitation center (120), to print the matrix barcode ticket, such as in case the visitor forgets their matrix barcode ticket. In accordance with embodiments of the present systems and methods a video visitation session may be conducted with respect to the non-resident on a terminal (located in a secure visitation area (115)) of the controlled-environment facility or in a secure visitation center (120) associated with the controlled-environment facility. In such embodiments the non-resident may be admitted to the controlled-environment facility visitation area or visitation center in response to confirming possession of the assigned matrix barcode by at least the non-resident taking part in the visitation at 210.

Validation of the non-resident's barcode at 210 may be carried out by, or with use of, barcode reading equipment (170, 175) or software associated with the controlled-environment facility visitation system. Alternatively, or additionally, a terminal (located in a secure visitation area (115)) of the controlled-environment facility or in a secure visitation center (120) may be enabled to read and verify the barcode, such as in conjunction with the controlled-environment facility visitation server, or the like. Validation of the non-resident's barcode at 210 my entail reading the respective assigned matrix barcode to confirm possession of the assigned matrix barcode by the at least one respective non-resident taking part in the visitation. Such confirmation that the respective non-resident is in possession of the assigned matrix barcode may then be communicated to the controlled-environment facility visitation server (105) by such barcode reading equipment, which may, in accordance with some embodiments, be incorporated into a visitation terminal (135*a*).

At 212, the controlled-environment facility visitation system enables the visitation to proceed between the resident and non-resident in response to confirmation, at 210, that at least the non-resident is in possession of the assigned matrix barcode.

In situations where the visitation is scheduled at 204 to take place in a secure visitation area (115) within the controlled-environment facility (110) the non-resident taking part in the visitation may be admitted to the visitation area in response to confirming possession of the assigned matrix barcode by the non-resident at 210. This visitation may then be enabled to proceed between the resident and non-resident in response to confirmation, also at 210, that the non-resident, and in embodiments where the resident is provided the matrix barcode that the resident, is in possession of the assigned matrix barcode.

Embodiments of the present systems and methods for controlling access to controlled-environment facility visitation centers and controlled-environment facility resident visits, via matrix barcoded tickets, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200, described above with respect to FIG. 2, and/or a computer system such as computer system 300 may be used as, or as part of, one or more of controlled environment facility visitation server 105, controlled-environment facility controlled-environment facility communication processing system 130, controlled-environment facility communications terminals 135a, portable controlled-environment facility resident communications devices 135b, one or more of non-resident computing and/or communications devices 140a, 140b, 140c, controlled-environment facility administration and management system 165, and/or the like. In various embodiments two or more of these computer systems may be configured to communicate with each other in any suitable way, such as, for example, via a network (e.g., in FIG. 1, network 125, and/or using wireless functionality, such as within controlled-environment facility 110).

As illustrated, example computer system 300 includes one or more processors 310 coupled to a system memory 320 via an input/output (I/O) interface 330. Example computer system 300 further includes a network interface 340 coupled to I/O interface 330, and one or more input/output devices 350, such as video device(s) 360 (e.g., a camera), audio device(s) 370 (e.g., a microphone and/or a speaker), and display(s) 380. Computer system 300 may also include a cursor control device (e.g., a mouse or touchpad), a keyboard, etc. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 and 2, above, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-readable medium may include any tangible or non-transitory storage media or memory media such as magnetic or optical media—e.g., disk or CD/DVD-ROM coupled to computer system 300 via I/O interface 330, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In some embodiments, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any suitable protocol, timing or other data transformations to convert data signals from one component (e.g., system memory 320) into a format usable by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments, some or all of the functionality of I/O interface 330, such as an interface to system memory 320, may be incorporated into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 3, memory 320 may include program instructions 325, configured to implement certain embodiments described herein, and data storage 335, comprising various data accessible by program instructions 325. In an embodiment, program instructions 325 may include software elements corresponding to one or more of the various embodiments illustrated in the above figures. For example, program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for controlling access to controlled-environment facility visitations, comprising:
a controlled-environment facility visitation server comprising:
at least one processor; and
a memory coupled to the processor, the memory having program instructions stored thereon that, upon execution by the processor, cause the controlled-environment facility visitation server to:
enable and accept requests for visitations with residents of the controlled-environment facility;
enable and accept scheduling of visitations with residents of the controlled-environment facility; and
assign a matrix barcode to each respective visitation;
provide each respectively assigned matrix barcode to at least one respective non-resident taking part in the respective visitation;
provide the assigned matrix barcode to a respective controlled-environment facility resident taking part in the respective visitation;
admit the at least one respective non-resident taking part in the respective visitation to a secure visitation area or center associated with the controlled-environment facility, in response to confirming possession of the assigned matrix barcode by the at least one respective non-resident taking part in the respective visitation; and
enable the visitation to proceed between the resident and the at least one respective non-resident in the secure visitation area or center, in response to confirmation that both the at least one non-resident and the resident are in possession of the assigned matrix barcode.

2. The system of claim 1, further comprising barcode reading equipment comprising or associated with:
at least one processor; and
a memory coupled to the processor, the memory having program instructions stored thereon that, upon execution by the processor, cause the barcode reading equipment to:
read the respective assigned matrix barcode to confirm possession of the assigned matrix barcode by the at least one respective non-resident taking part in the visitation; and
communicate confirmation that the at least one respective non-resident is in possession of the assigned matrix barcode to the controlled-environment facility visitation server; and
wherein the controlled-environment facility visitation server program instructions, upon execution by the processor, further cause the controlled-environment facility visitation server to:
enable the visitation to proceed between a respective controlled-environment facility resident and the at least one respective non-resident in response to confirmation that the at least one respective non-resident is in possession of the assigned matrix barcode.

3. The system of claim 1, wherein a respective request is initiated by the respective controlled-environment facility resident.

4. The system of claim 1, wherein the request is initiated by the same or another non-resident.

5. The system of claim 1, wherein the assigned matrix barcode is provided to the at least one non-resident on a computing and/or communications device associated with the at least one non-resident.

6. The system of claim 1, wherein the visitation is a video visitation session.

7. The system of claim 6, further comprising at least one terminal disposed in the secure visitation area or center associated with the controlled-environment facility.

8. The system of claim 1, wherein the program instructions further cause the controlled-environment facility visitation server to admit the non-resident and controlled-environment facility resident taking part in the visitation to the visitation area in response to barcode reading equipment confirming possession of the assigned matrix barcode by the at least one non-resident and controlled-environment facility resident, and to enable the visitation to proceed between the resident and the at least one non-resident in response to confirmation by barcode reading equipment that the resident and the at least one non-resident are both in possession of the assigned matrix barcode.

9. The system of claim 1, wherein the program instructions further cause the controlled-environment facility visitation server to provide the assigned matrix barcode to the resident on a controlled-environment facility resident personal portable communications device associated with the resident.

10. A method for controlling access to controlled-environment facility visitations, comprising:
receiving, by a controlled-environment facility visitation system, a request for a visitation with a resident of the controlled-environment facility;
scheduling, by the controlled-environment facility visitation system, the visitation with a resident of the controlled-environment facility;
assigning, by the controlled-environment facility visitation system, a matrix barcode to the visitation;
providing, by the controlled-environment facility visitation system, the assigned matrix barcode to at least one non-resident taking part in the visitation;
providing, by the controlled-environment facility visitation system, the assigned matrix barcode to the resident of the controlled-environment facility taking part in the respective visitation;

admitting the at least one non-resident to a secure visitation area or center associated with the controlled-environment facility, in response to confirming possession of the assigned matrix barcode by the at least one non-resident taking part in the visitation; and enabling the visitation to proceed between the resident and the non-resident in the secure visitation area or center, in response to confirmation that both the at least one non-resident and the resident are in possession of the assigned matrix barcode.

11. The method of claim 10, further comprising:

confirming, by barcode reading equipment, possession of the assigned matrix barcode by at least at least one non-resident taking part in the visitation; and enabling, by the controlled-environment facility visitation system, the visitation to proceed between the resident and non-resident in response to confirmation, by the barcode reading equipment, that both the at least one non-resident and the resident are in possession of the assigned matrix barcode.

12. The method of claim 10, wherein the request is initiated by a controlled-environment facility resident.

13. The method of claim 10, wherein the request is initiated by a non-resident.

14. The method of claim 10, wherein the assigned matrix barcode is provided to the at least one non-resident on a computing and/or communications device associated with the non-resident.

15. The method of claim 10, wherein the visitation is a video visitation session.

16. The method of claim 15, wherein the video visitation session is conducted with respect to the at least one non-resident on a terminal located in the secure visitation area or center associated with the controlled-environment facility.

17. The method of claim 10, wherein the assigned matrix barcode is provided to the resident on a controlled-environment facility resident personal portable communications device associated with the resident.

18. A computer readable non-transitory medium having program instructions stored thereon that upon execution by a controlled-environment facility visitation system, cause the controlled-environment facility visitation system to:

enable and accept requests for visitations with residents of the controlled-environment facility;

enable and accept scheduling of visitations with residents of the controlled-environment facility;

assign a matrix barcode to each scheduled visitation;

provide the assigned matrix barcode to at least a non-resident taking part in a respective scheduled visitation;

provide the assigned matrix barcode to a respective controlled-environment facility resident taking part in the respective scheduled visitation;

admit the non-resident taking part in the respective scheduled visitation to a secure visitation area or center associated with the controlled-environment facility in response to confirming possession of the assigned matrix barcode by at least the non-resident taking part in the respective scheduled visitation; and enable the visitation to proceed between the resident scheduled to take part in the respective scheduled visitation and the non-resident in the secure visitation area or center, in response to confirmation that both the non-resident and the resident are in possession of the assigned matrix barcode.

* * * * *